F. O. BULLIS.
COMBINED DISPENSING AND MEASURING DEVICE.
APPLICATION FILED SEPT. 28, 1914.
1,225,107.
Patented May 8, 1917.
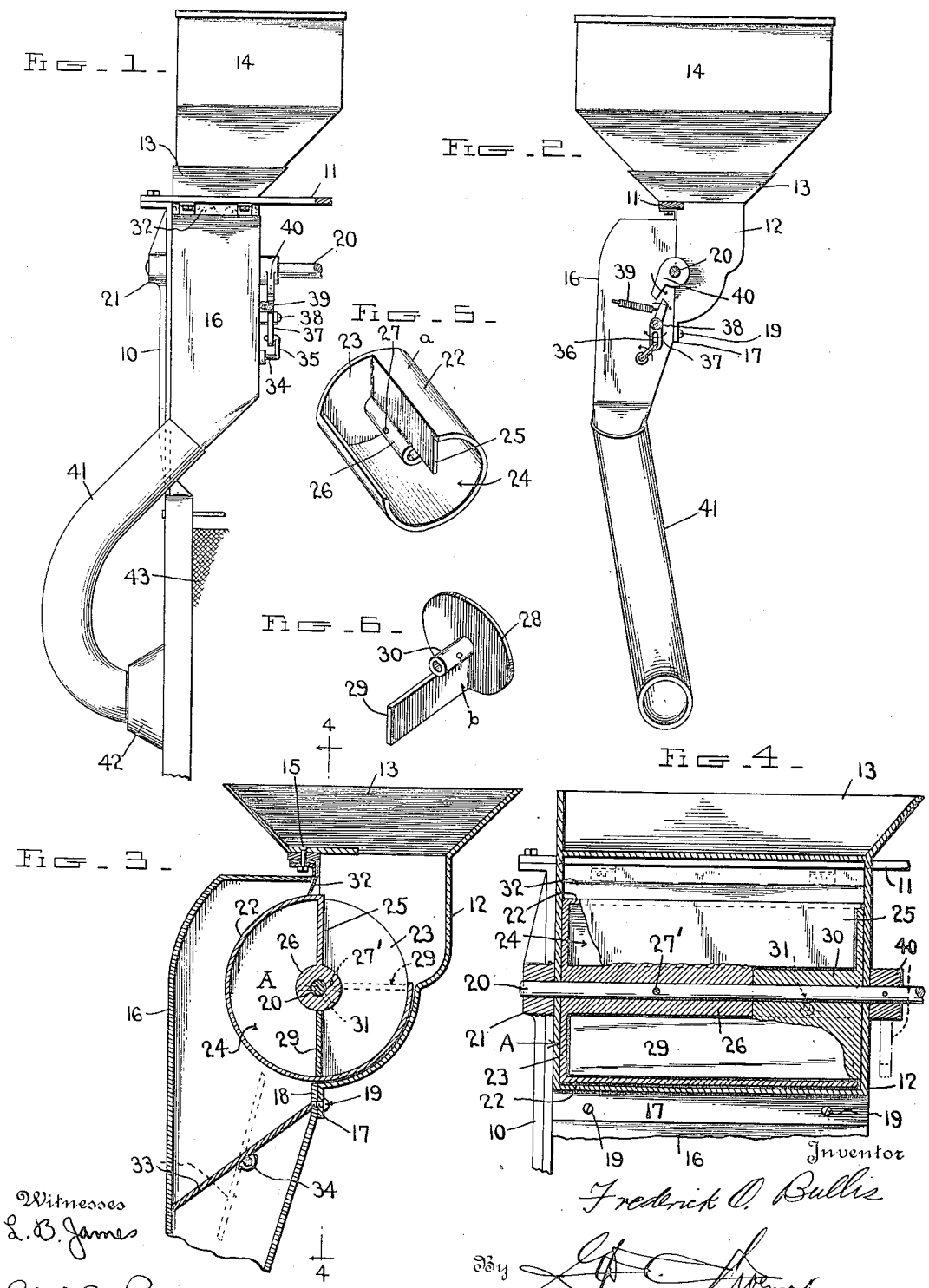

UNITED STATES PATENT OFFICE.

FREDERICK O. BULLIS, OF LOUISVILLE, KENTUCKY, ASSIGNOR TO LEKTRIC SALES COMPANY, OF LOUISVILLE, KENTUCKY, A CORPORATION OF KENTUCKY.

COMBINED DISPENSING AND MEASURING DEVICE.

1,225,107.

Specification of Letters Patent.    Patented May 8, 1917.

Application filed September 28, 1914. Serial No. 863,963.

*To all whom it may concern:*

Be it known that I, FREDERICK O. BULLIS, a citizen of the United States, residing at Louisville, in the county of Jefferson and State of Kentucky, have invented certain new and useful Improvements in Combined Dispensing and Measuring Devices, of which the following is a specification.

This invention relates to a combined dispensing and measuring device.

One object is to provide a dispensing device for dispensing corn, rice, coffee or other commodities in measured quantities to a container or person, each batch or quantity being taken in measured quantity from a casing or hopper or other receptacle and discharged into a chute where it is confined until released therefrom.

Another object resides in the provision of a dispensing device embodying among other characteristics a measuring device which is peculiarly constructed so that it may be adjusted to different capacities for the measuring of varied quantities of commodities.

With the above and other objects in view, the present invention consists in the combination and arrangement of parts hereinafter more fully described, illustrated in the accompanying drawings, and particularly pointed out in the appended claims, it being understood that changes may be made in the form, proportion, size and minor details without departing from the spirit or sacrificing any of the advantages of the invention.

In the drawings:

Figure 1 is an end elevation of the invention.

Fig. 2 is a side elevation of the invention.

Fig. 3 is a vertical sectional view.

Fig. 4 is a sectional view on the line 4—4 of Fig. 3 and

Figs. 5 and 6 are detail perspective views of the parts forming the measuring device.

Referring now more particularly to the accompanying drawings, the reference character 10 indicates a supporting frame of any suitable character including preferably a horizontal member 11 by which my improved dispensing and measuring device may be supported.

The character 12 indicates a casing. The lower portion of the casing is preferably rounded, as shown, for a purpose presently explained. The upper portion of the casing is preferably flared, as at 13, to form a pocket for the reception of a hopper or other suitable container 14. One side of the casing 12 below the flared portion 13 thereof is open and the end walls of the casing immediately beneath the flared portion 13 are preferably notched to receive the aforesaid supporting member 11 to which the casing 12 may be secured by means of suitable bolts 15.

Secured to the casing 12 at the open side thereof is a chute 16. This chute has communication with the casing 12 through said open side of the latter and it may be secured to the casing in any suitable manner. One way in which the chute 16 may be secured to the casing 12 is to provide the latter with a flange 17 at its lower portion which is adapted to be disposed parallel with a vertical portion 18 of the chute so that at the portions 17 and 18 of the casings 12 and 16, respectively, they may be firmly connected together by means of suitable bolts or other fastenings 19.

Where the corresponding sides of the casing and chute are connected together, they are notched to form bearings to receive a rotatable shaft 20 which, at one end, may be journaled in the bearing 21 of the frame 10 and which may be rotated through the instrumentality of any suitable means.

Keyed to the rotatable shaft 20 is a measuring device A which is adapted to rotate partly within the casing 12 and partly within the chute 16 and at the lower portion of the casing adjacent the rounded portion of the latter.

The measuring device A may be of various formations but, is shown as consisting of two parts *a* and *b*. The part *a* is preferably in the form of a cylindrical shaped member 22 having one open end and a closed end 23 provided with an opening 24 throughout its entire length and which opening is preferably of a width substantially one-quarter of the circumference of the cylindrical shaped member 22. Extending inwardly from the inner wall 22 of the member *a* is a wall 25 which at its free edge is provided with an elongated bearing 26 extending throughout a portion of the free edge of the wall 25. This bearing 26 is provided with an aperture 27 by means of which it may be secured to the aforesaid shaft 20 by means of a suitable key 27'. The member *b* is formed to include an end 28 adapted to close the open end of the member *a*. It also includes a partition member 29 at one edge of which is formed a bearing 30. The bearing 30 is adapted to fit on the aforesaid shaft 20 and therefore is adapted to be disposed in alinement with the bearing 26 and in one adjustment of the measuring device the partition member 29 coöperates with the wall 25 to divide the cylindrical shaped member *a* into one-half or into one-quarter or into any other adjustment according to the disposition of the partition member 29 with relation to the wall 25. To maintain the partition member 29 in various adjusted positions with relation to the wall 25 the bearing 30 is preferably provided with an aperture to receive a key 31 which is adapted to fit therein and engage the shaft 20.

It will thus be understood that by virtue of the peculiar formation of the measuring device illustrated and described there is formed a rotatable member which rotates partly in the casing 12 and partly in the chute 16 and that in its formation it includes a pocket which is adapted in the rotation of the measuring device to take corn or other commodities from the casing 12 to the chute 16 whereby communication between the chute 16 and the hopper is established by the measuring device which prevents entrance of corn or other commodity into the chute 16 only when the pocket of the measuring device transfers the material from the casing to the chute.

If desired, a strip of leather or other suitable material 32 may extend into the chute and bear against the measuring device A as shown particularly in Fig. 3. This strip of material 32 will prevent the ingress of foreign matter and also prevent accidental discharge of material from the casing 12 above the upper portion of the chute during operation of the measuring device. One way in which this strip of material 32 may be thus supported is by means of the aforesaid bolts 15 which secure the casing 12 to the supporting strip 11.

In the chute 16 is a valve 33 secured to a shaft 34 which extends through one end of the chute. The projecting end of this shaft is provided with a crank arm 35 whose free end is adapted to fit in a slot 36 formed in one end of a bell crank lever 37 pivoted at 38 on the chute 16 and which is held normally in one position by means of a spring 39 adapted to hold the valve 30 normally closed, that is, in the full line position in Fig. 3.

Under the influence of rotation of the shaft 20 the measuring device A which is secured thereto is rotated and, as hereinbefore stated, it takes corn or other material in measured quantities according to the adjusted capacity of the measuring device, from the casing 12 and transfers it to the chute 16 where it falls upon the valve 33 and where it is arrested and not dispensed from the chute until a predetermined time.

To effect operation of the normally closed valve 33 and thereby dispense the measured material fed by the measuring device into the chute, the shaft 20 is preferably provided with a dog 40 keyed thereto and which, during each rotation of the shaft 20, is adapted to engage the aforesaid lever 37 and move the same on its pivot 38 against the tension of the aforesaid spring 39. This movement of the lever 37 against the tension of the spring 39, by virtue of its connection with the crank portion 35 of the shaft 34, causes tilting movement of the valve 33 to the dotted line position shown in Fig. 3. This operation of the dog 37 by the dog 40 to effect discharge of the measured material from the chute 16 takes place at a time when the measuring device has returned to its normal position to receive material from the casing 12. Therefore, under the influence of continuous rotation of the shaft 20 there is an alternate receiving of the material and discharge of the same from the chute, the material being retained temporarily in the chute 16 by the valve 33 before the valve is opened to discharge the material from the chute.

The chute may be provided with an extension 41 which may be formed upon a curve to present its lower end to a member 42 which forms an opening leading into a drum or other suitable receptacle 43, a portion of which latter only is shown for purpose of illustration. The extension 41 may be of any formation and may convey the measured quantities to a receptacle, customer or to any desired source.

What is claimed is:—

1. In a measuring apparatus, a casing, a rotary measuring member mounted in said casing and comprising a cylinder having an inwardly directed partitioning blade, a sleeve carried by the blade, a member forming a closure for one end of said cylinder, a partitioning blade carried by said member and disposed to extend within the cylinder, a sleeve carried by said blade, and a shaft passing through the sleeves of the partitioning blades.

2. In a measuring apparatus, a casing, a shaft mounted in said casing, a rotary measuring member mounted on said shaft and comprising a cylinder, a partition extending inwardly from said cylinder, a closure for one end of said cylinder, a partition extending inwardly from said closure, and bearing means carried by the partitions through which the aforesaid shaft extends.

3. In a measuring apparatus, a casing, a shaft extending through the casing, a rotary measuring member on the shaft, a second shaft extending through the casing, a valve mounted on the second shaft, a dog on the first mentioned shaft, a crank arm on the second mentioned shaft, a bell crank lever mounted on the casing and having a slot at one end for engaging the crank arm, the other end of the bell crank lever adapted to engage the dog, and a spring for normally holding the bell crank lever in one position, whereby in one position of the measuring member the valve will be open and in another position of the measuring member the valve will be closed.

In testimony whereof I affix my signature in presence of two witnesses.

FREDERICK O. BULLIS.

Witnesses:
T. J. COMER,
FRANK G. CLARK.